(12) United States Patent
Zhang et al.

(10) Patent No.: US 12,124,330 B2
(45) Date of Patent: Oct. 22, 2024

(54) SOFT DECODING ERROR PREDICTION

(71) Applicant: SK hynix Inc., Gyeonggi-do (KR)

(72) Inventors: Fan Zhang, San Jose, CA (US); Meysam Asadi, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/175,843

(22) Filed: Feb. 28, 2023

(65) Prior Publication Data
US 2024/0289215 A1  Aug. 29, 2024

(51) Int. Cl.
G11C 29/00 (2006.01)
G06F 11/07 (2006.01)
G06F 11/10 (2006.01)

(52) U.S. Cl.
CPC ........ G06F 11/1068 (2013.01); G06F 11/076 (2013.01); G06F 11/0793 (2013.01)

(58) Field of Classification Search
CPC . G06F 11/1068; G06F 11/076; G06F 11/0793
See application file for complete search history.

(56) References Cited

U.S. PATENT DOCUMENTS

| | | | |
|---|---|---|---|
| 11,159,176 B1* | 10/2021 | Venugopal | H03M 13/3961 |
| 11,258,466 B1* | 2/2022 | Kanter | G06F 11/1012 |
| 2014/0223256 A1 | 8/2014 | Sakai et al. | |
| 2019/0348143 A1 | 11/2019 | Zeng et al. | |
| 2022/0222139 A1* | 7/2022 | Shin | G06F 11/1012 |

* cited by examiner

Primary Examiner — Christine T. Tu
(74) Attorney, Agent, or Firm — IP & T GROUP LLP

(57) ABSTRACT

A memory system having a memory block and a memory controller in communication with the memory block. The memory controller is configured to: read and decode codewords from the memory block, determine a fail bit count (FBC), a strong correct (SC) rate indicating a percentage of failed bits correctable through log likelihood ratios (LLRs), and a number of spare bytes in the codewords decoded from the memory, predict a soft decoding error based on a fixed FBC, a fixed SC rate, and the number of spare bytes, and determine soft errors in the codewords read from the memory block based on the predicted soft decoding error.

20 Claims, 9 Drawing Sheets

SOFT DECODING ERROR PREDICTION

BACKGROUND

1. Field

Embodiments of the present disclosure relate to determining soft errors in data read from storage device.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

There are two kinds of errors in data (words) stored in a memory. One is a temporary error, such as a soft error, which can be corrected in the memory by writing back (rewriting) the corrected data. The other is a hard error which cannot be corrected in the memory by rewriting the corrected data.

SUMMARY

In one embodiment of the present invention, there is provided a memory system having a memory block and a memory controller in communication with the memory block. The memory controller is configured to: read and decode codewords from the memory block, determine a fail bit count (FBC), a strong correct (SC) rate indicating a percentage of failed bits correctable through log likelihood ratios (LLRs), and a number of spare bytes in the codewords decoded from the memory, predict a soft decoding error based on a fixed FBC, a fixed SC rate, and the number of spare bytes, and determine soft errors in the codewords read from the memory block based on the predicted soft decoding error.

In one embodiment of the present invention, there is provided a method for identifying soft errors in a memory block. The method reads and decodes codewords from the memory block; determines a fail bit count (FBC), a strong correct (SC) rate indicating a percentage of failed bits correctable through log likelihood ratios (LLRs), and a number of spare bytes in the codewords decoded from the memory; predicts a soft decoding error based on a fixed FBC, a fixed SC rate, and the number of spare bytes; and determines the soft errors based on the predicted soft decoding error.

Additional aspects of the present invention will become apparent from the following description.

DETAILED DESCRIPTION

Figure 1:
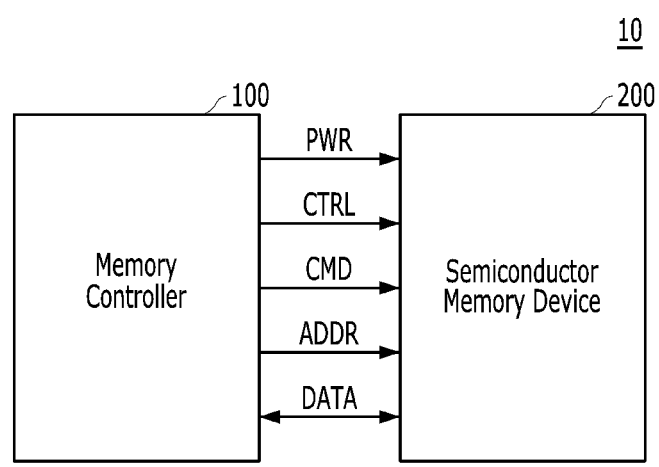
FIG. 1 is a block diagram illustrating a memory system in accordance with one embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this conveys the scope of the present invention to those skilled in the art. Moreover, reference herein to "an embodiment," "another embodiment," or the like is not necessarily to only one embodiment, and different references to any such phrases are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The invention encompasses numerous alternatives, modifications and equivalents to the disclosed embodiments. Numerous specific details are set forth in the following description in order to provide a thorough understanding of the invention. These details are provided for the purpose of example; the invention may be practiced without some or all of these specific details. For clarity, technical material that is known in technical fields related to the invention has not been described in detail so that the invention is not unnecessarily obscured.

FIG. 1 is a block diagram schematically illustrating a memory system in accordance with one embodiment of the present invention.

Referring to FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as for example a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
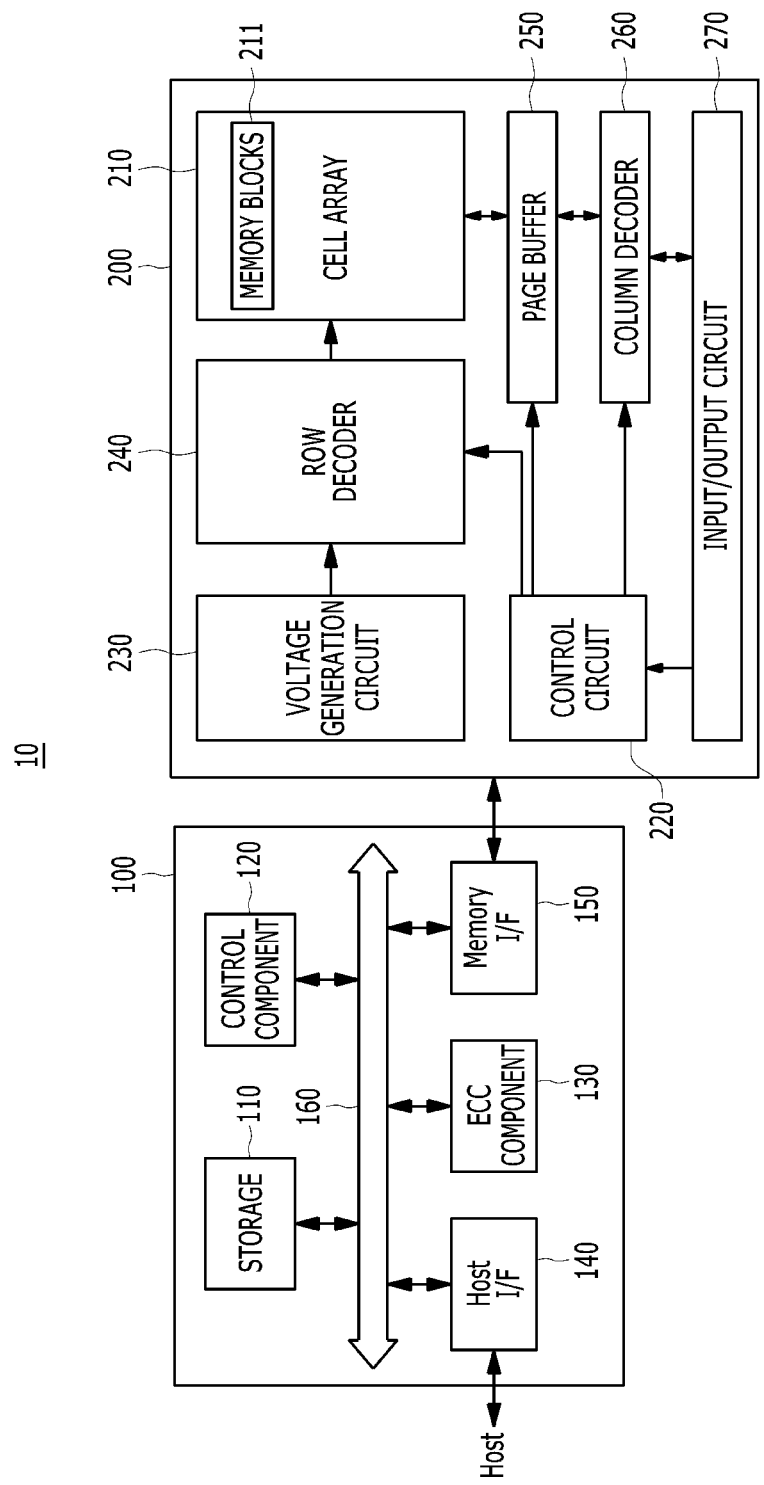
FIG. 2 is a block diagram illustrating a memory system in accordance with another embodiment of the present invention.

FIG. 2 is a detailed block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as for example a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as for example a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as for example a dynamic random access memory (DRAM) and/or a static random access memory (SRAM) or a non volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and write and read operations for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on coded modulation techniques such as for example a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a block coded modulation (BCM). As such, the ECC component 130 may include circuits, systems or devices for suitable error correction operation. In particular, the ECC component 130 may include an encoder and an LDPC decoder, e.g., a single LDPC chip-kill decoder.

The host interface 140 may communicate with the host device through one or more of various interface protocols such as for example a universal serial bus (USB), a multimedia card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as erase and pass voltages.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3A:
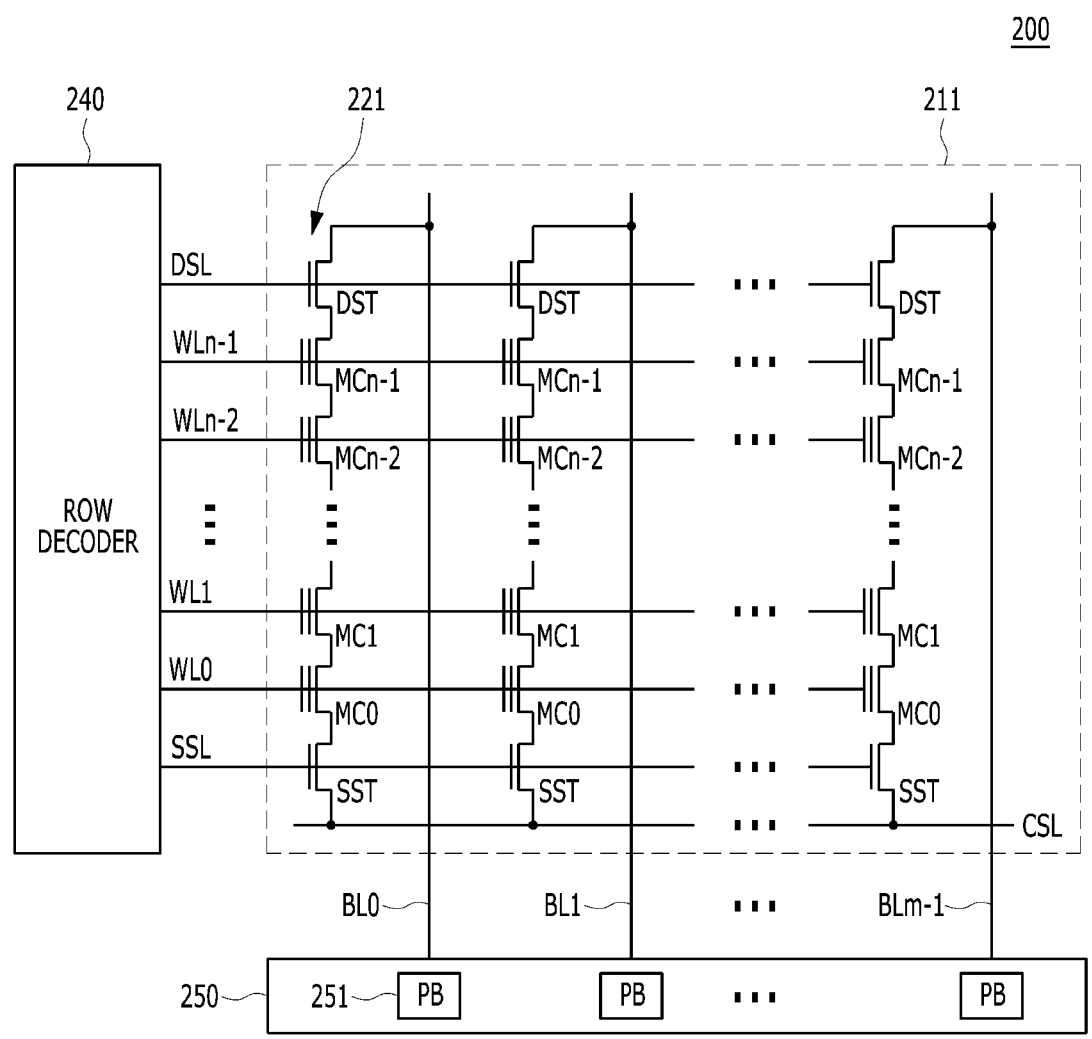
FIG. 3A is a circuit diagram illustrating a memory block of a memory device of a memory system in accordance with still another embodiment of the present invention.

The page buffer 250 may be in electrical communication with the memory cell array 210 through bit lines BL (shown in FIG. 3A). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250, and may also exchange data with the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3A is a circuit diagram illustrating a memory block of a semiconductor memory device in accordance with another embodiment of the present invention. For example, the memory block of FIG. 3A may be any of the memory blocks 211 of the memory cell array 200 shown in FIG. 2.

Referring to FIG. 3A, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer 250 may include a plurality of separate page buffers PB 251 that are coupled to the bit lines BL0 to BLm−1. The page buffers PB 251 may operate in response to page buffer control signals. For example, the page buffers PB 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 3B:
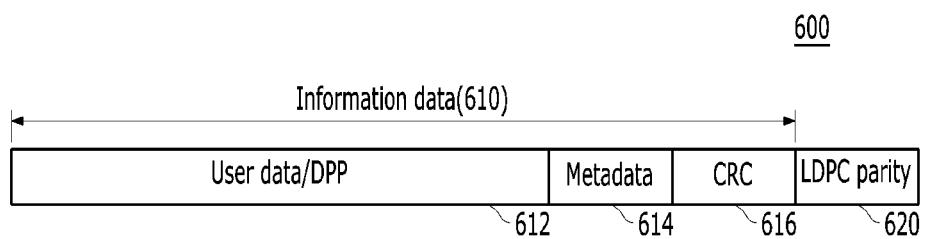
FIG. 3B is a schematic illustrating a codeword stored in a memory block containing user data and parity information in accordance with another embodiment of the present invention.

FIG. 3B is a diagram illustrating a format of a codeword 600 to be stored in a storage system. Referring to FIG. 3B, the codeword 600 may include information data 610, and parity data 620. In some embodiments, the codeword 600 may be generated based on the coded modulation techniques described above such low-density parity-check (LDPC) codes. In other words, the information data 610 may be protected by LDPC codes, and the parity 620 may be a LDPC parity. The information data 610 may include user data with data path protection (DPP) 612, meta-data 614, and cyclic redundancy check (CRC) parity bits 616. A CRC code which is an error-detecting code commonly used in digital networks and storage devices may detect accidental changes to raw data. The number of spare bytes do not contain user data or parity data.

After a memory array including a plurality of memory cells as in FIGS. 2 and 3A is programmed, when a read operation is performed on the memory array using a certain voltage reference value such as a read threshold (i.e., read voltage level), the electrical charge levels of the memory cells (e.g., threshold voltage levels of transistors of memory cells) are compared to one or more voltage reference values (also called "read voltage level" or "read threshold") to determine the state of individual memory cells. When a certain read threshold is applied to the memory array, those memory cells that have threshold voltage levels higher than the certain voltage reference value are turned on and detected as "on" cells, whereas those memory cells that have threshold voltage levels lower than the certain voltage reference value are turned off and detected as "off" cells, for example. Therefore, each read threshold is arranged between neighboring threshold voltage distribution windows corresponding to different programmed states so that each read threshold can distinguish such programmed states by turning on or off the memory cell transistors.

When a read operation is performed on memory cells in a data storage device using MLC technology, the threshold voltage levels of the memory cells are compared to more than one read threshold level to determine the state of individual memory cells. Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors. For example, as program/erase cycles increase, the margin between neighboring threshold voltage distributions of different programmed states decreases and eventually the distributions start overlapping. As a result, the memory cells with threshold voltages that fall within the overlapping range of the neighboring distributions may be read as being programmed to a value other than the original targeted value and thus cause read errors. Such read errors may be managed in most situations by using error correction codes (as noted above). When the number of bit errors on a read operation exceeds the ECC correction capability of the data storage, the read operation fails.

Error information may be provided by fail bit counts obtained from decoding read data from a memory device using the read threshold voltage set. While the present invention is not limited to using a deep neural network DNN for an error recovery algorithm, a DNN may derive optimal read thresholds associated with the operating conditions of a NAND. In general, the error recovery algorithm may record and update the last successful read threshold as a set of historical read threshold voltages. Yet, optimal read threshold voltage may frequently change depending on various factors including the condition or state of the memory device.

If one of the historical read threshold voltages fail, then a history-read retry (HRR) operation will be performed. The HRR operation includes a series of pre-determined Vt thresholds that remain the same across time, and do not change as a function of NAND condition or physical location of the data. Typically, there are 5 to 10 HRR operations (or read attempts) performed before moving to a subsequent step in the data recovery operation.

Frequent changes in the read threshold voltages or frequent attempts to derive optimal read thresholds when there are hard errors present can result in more transmissions between the controller and the memory device and may increase the overall read latency, thereby degrading quality of service (QoS) of read operations of the memory system.

There are two common types of algorithms for error-correction control, the hard-decoding algorithm and the soft-decoding algorithm. For the hard-decoding algorithm, the hard information which indicates that the input information is "0" or "1" is used. However, the soft information is used for the soft-decoding algorithm, which not only tells the decoder if the input information is "0" or "1", but also provides the decoder how likely it is "0" of "1". Usually if soft information is provided, a soft-decoding algorithm provides a better error correction performance than a hard-decoding algorithm. In NAND flash storage systems, an error-correction control solution will try the hard decoding first. When the hard decoding fails, the soft-decoding algorithm will be used.

One method to optimize a read reference voltage is to minimize the RBER, such that the hard-decoding algorithm can achieve the best performance. However, the error correction performance of the soft-decoding algorithm depends on not only the RBER but also the distribution of log-likelihood (LLR) information. Multiple read reference voltages might provide different approximation for the LLR information distribution of a channel and therefore give different error correction performance for the soft-decoding algorithm.

Inventive Detection of Soft Errors

One of the most important issues to address in defense algorithms or media management algorithms is how to precisely predict soft decoding failure. For example, a defense algorithm which re-performs a read operation of adjusting a read voltage and a soft decoding operation which is a decoding stage after an e-Boost operation both need to know the soft decoding failures. Similarly, a media management algorithm (such as wear leveling, refresh, garbage collection, scrub, etc.) needs to know the soft decoding failures. Many of the important algorithms depend on this. For example, a media scan algorithm typically uses the fail bit count (FBC) of a test reads (using for example a media scan algorithm) to compare to a predefined threshold number of failed bits. If the FBC is higher than the predefined threshold number of failed bits, data will be recycled. An ESD (early selection decoding) module will skip decoding if the checksum, which is an approximation of the FBC, is higher than a threshold.

The present invention has been made in this context realizing that none of the existing schemes can precisely predict soft decoding failure. Here, in one aspect of the present invention, a novel scheme predicts soft decoding failure more accurately than prior existing schemes. Because penta-level cell (PLC) NAND uses soft decoding for 100% of the read traffic, being able to predict soft decoding failure precisely becomes even more important.

Figure 4:
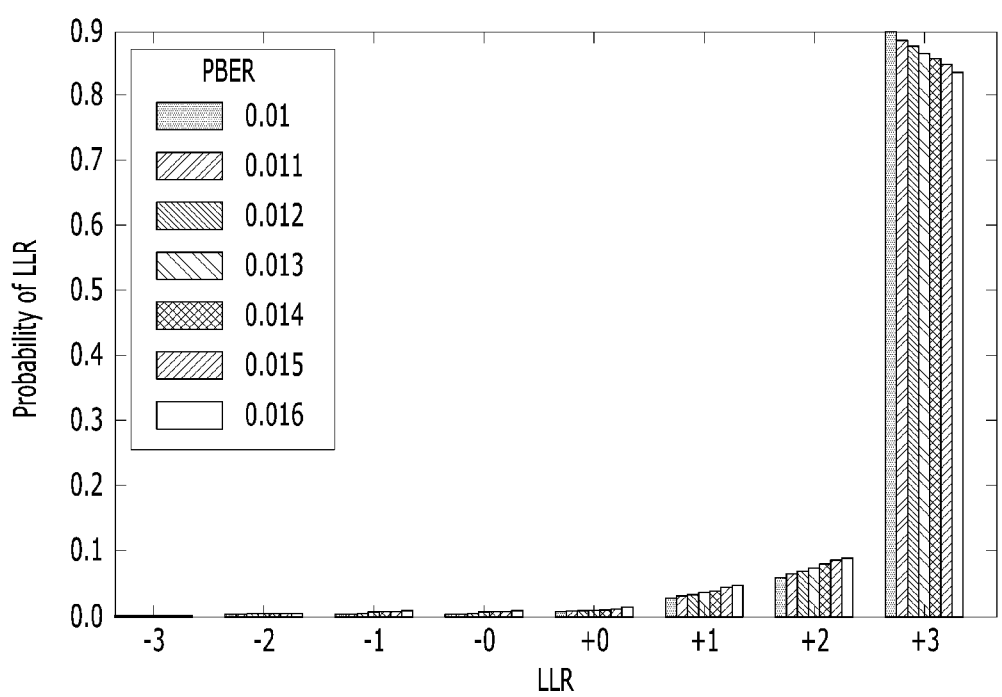
FIG. 4 is a plot showing the probability of a log-likelihood ratio (LLR) correcting a soft error as a function of a LLR distribution having different raw bit error rates (RBER), in accordance with one embodiment of the present invention.

In soft decoding, failure probability is determined by the entire log likelihood ratio (LLR) distribution, which is shown in FIG. 4 as an example. This is different than a hard decoding case where a decoder behavior is determined by only evaluating the FBC, which is 1 dimensional. Soft decoder's behavior may be determined by an eight (8) dimensional vector for the three (3) read case. This behavior makes the prediction of decoder's behavior, e.g. failure rate, throughput, latency, etc. difficult. FBC can be thought of as a one-dimensional projection of the eight-dimensional LLR distribution.

Soft Decoder Failure Rate Conditioning on FBC

Figure 5:
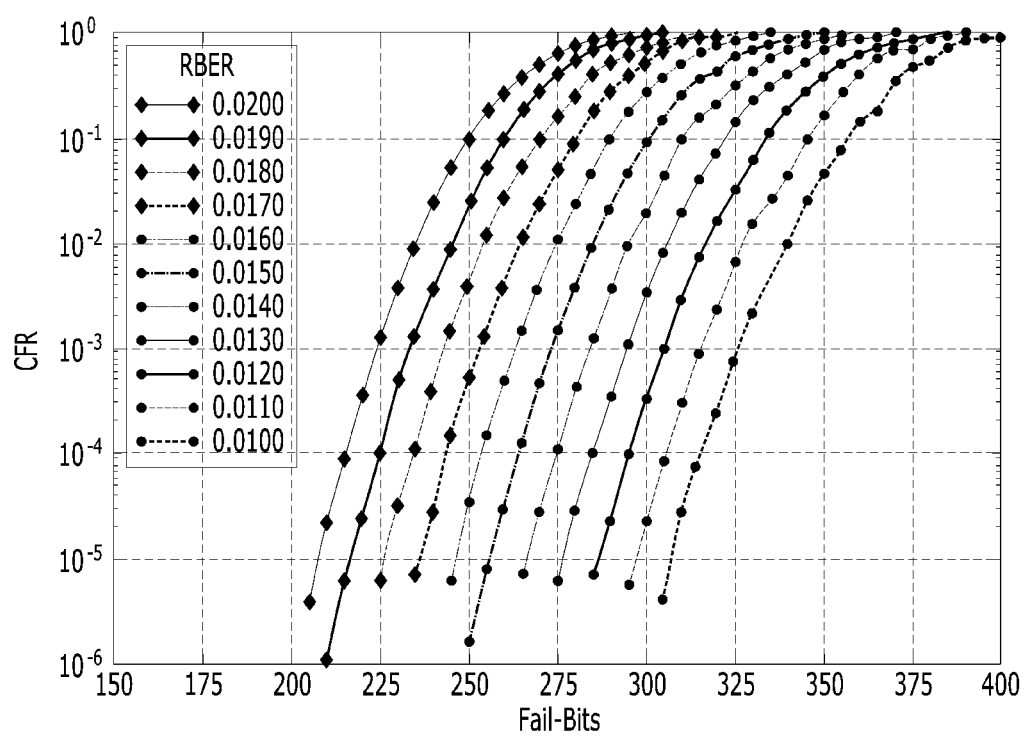
FIG. 5 is a plot showing codeword failure rates (CFR) as a function of fail bits (FB) having different RBERs, in accordance with another embodiment of the present invention.

In FIG. 5, it can be seen that, for the same FBC, one may expect large (>10 orders) difference in the codeword failure rate (CFR) if the LLR distribution is different. In FIG. 5, for example, the diamond line for RBER 0.0200 represents the CFR when the raw bit error rate (RBER) of additive white Gaussian noise (AWGN) channel is fixed at 0.02. For a certain FBC, for example 250, the CFR varies in the range 1E-1 to 1E 6 depending on the channel RBER. It is clear that soft decoder failure rate may change significantly (possibly be in error) if only accounts for the FBC made without accounting for RBER.

Soft Decoder Failure Rate Conditioning on FBC and Hard Error

While conditioning based on both FBC and a hard error percentage is believed conventionally to be possible, and while it is believed that the CFR can be uniquely determined and used to predict soft decoding failure rate based on FBC and hard error rate, the present invention recognizes that these presumptions are in error.

Figure 6:
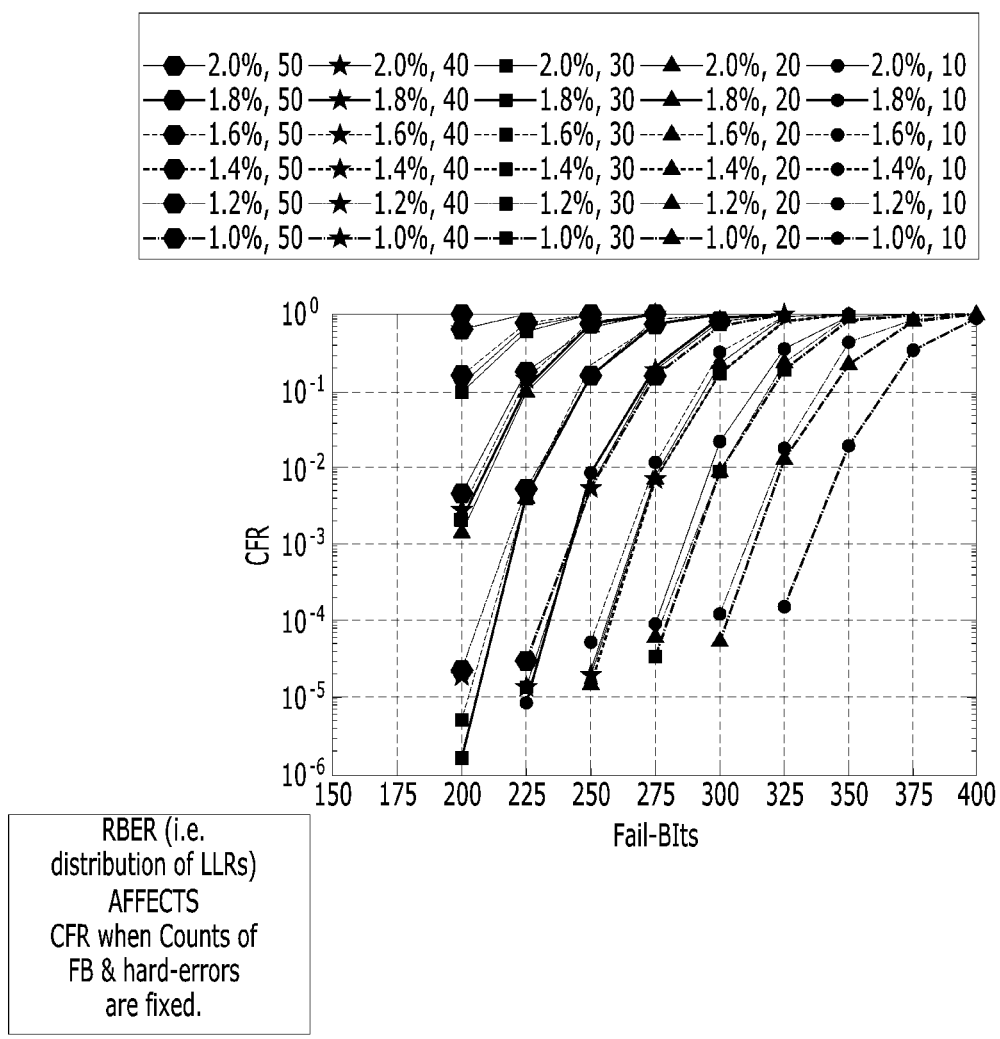
FIG. 6 is another plot showing codeword failure rates (CFR) as a function of fail bits (FB) having different RBERs, in accordance with still another embodiment of the present invention.

FIG. 6 shows that, even with fixing the FBC and hard error percentage, the CFR can still change significantly based on the RBER.

Soft Decoder Failure Rate Conditioning on FBC and Strong Correct

Figure 7:
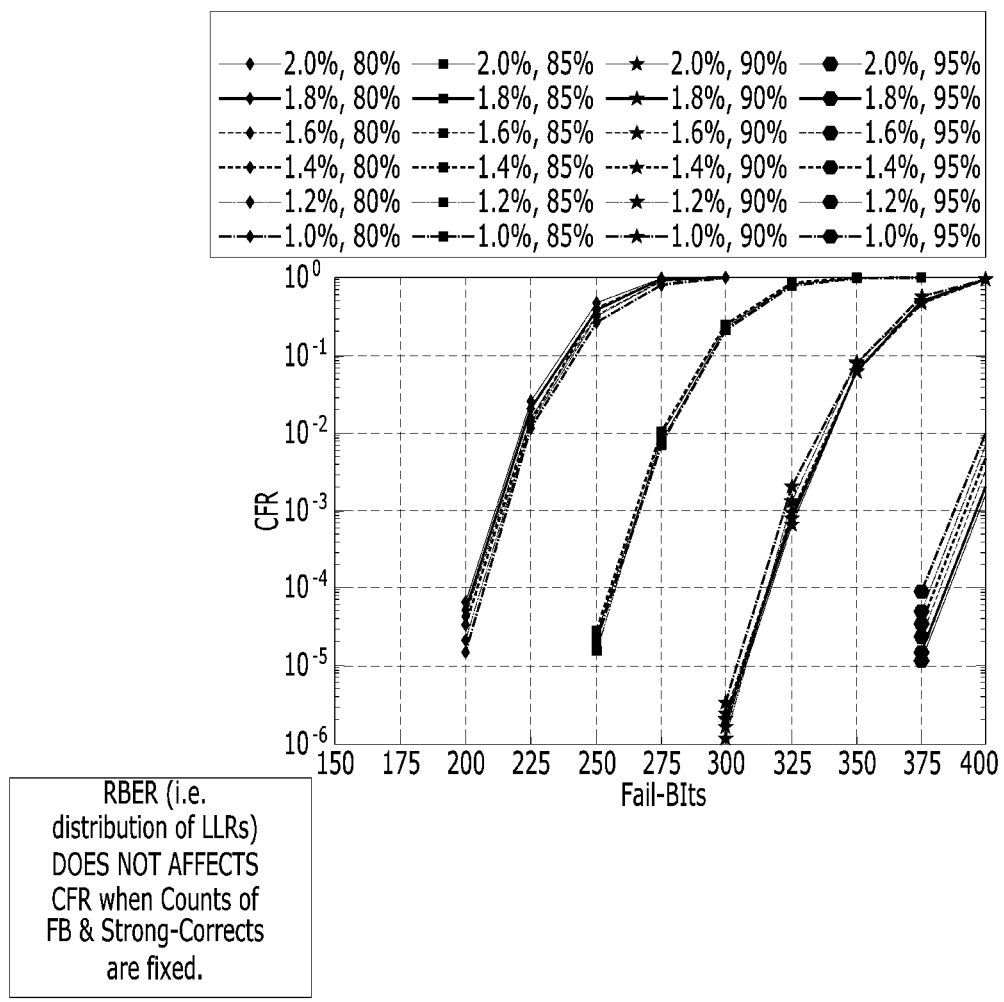
FIG. 7 is another plot showing codeword failure rates (CFR) as a function of fail bits (FB) having different RBERs, in accordance with yet another embodiment of the present invention.

FIG. 7 shows that the CFR of a soft decoder can be uniquely determined by fixing the FBC and the strong correct rate. In other words, the change in LLR distribution does not change CFR if the FBC and strong correct rate are both fixed.

In hardware, the strong correct rate can be counted by comparing the decoder input, e.g., LLR, and decoder output. Upon successful decoding, each bit of a codeword is a strong correct (SC) bit if the corresponding bit in decoder input sequence and decoder output sequence are the same (unchanged during decoding) and the corresponding LLR value has the maximum magnitude.

The soft decoding error prediction can be implemented by a two (2) dimensional table (or a data look-up table) such as shown in Table 1. In Table 1, it can be seen that, when the spare byte size is less than 8%, and the SC rate is between 80% and 90%, and when the FBC is higher than 400 bits per 4 KB, the soft decoding may fail with a probability of 1E-12 or higher. Here, in this context, spare byte size is the amount of additional space available to store the parity (LDPC) bits. In this example, 4 KB is the size of information data (FIG. 3B, 610). A spare byte size of 8% means 8%*4 KB of space is available for LDPC parity. Therefore, the code rate (which is size of information data divided by codelength) can be computed as 4 KB/4 KB(1+0.08)=1/1.08.

Table 1 shows data for the probability of a mini-sum soft (MSS) algorithm decoding failure of less than 1E-12:

| MSS FR = 1E-12 | Spare <= 8% | 8% < Spare <= 12% | Spare > 12% |
|---|---|---|---|
| SC => 90% | FBC > 500 | FBC > 600 | FBC > 700 |
| 80% <= SC < 90% | FBC > 400 | FBC > 500 | FBC > 500 |
| SC < 80% | FBC > 300 | FBC > 400 | FBC > 300 |

There are many ways to utilize this soft decoding failure prediction scheme. One example is the media scan and data reclaim algorithm. This inventive scheme allows the media scan to be much more effective and avoid unnecessary relocation of data that in reality is valid, and reduces the risk of reliability violation. The inventive scheme can also be used in NAND reliability Spec methodology and component level qualification.

Application in NAND Reliability Qualification

In the NAND reliability specification, instead of only specifying a max RBER or FBC for NAND as a pass/fail (P/F) criterion, a similar table as Table 1 may be provided for NAND product evaluation describing the soft decoder's failure rate at different spare byte percentages and strong-correct Sc percentages. In the NAND qualification, a series of stress test conditions may be exercised and the max FBC and SC % will be measured per condition. NAND qualification will declare success if max FBC falls below the number; otherwise, a failure will be declared. For example, for TLC NAND, the spare byte is between 8% and 12%, in every test condition, the measured SC % and FBC can ensure that every page passes. For example, a page has SC % to be 90%, and FBC=587, this is considered as a pass for this page. If a page has SC % to be 70% and FBC=410, then this page will be declared as a failure in the test.

Error Processing

Figure 8:
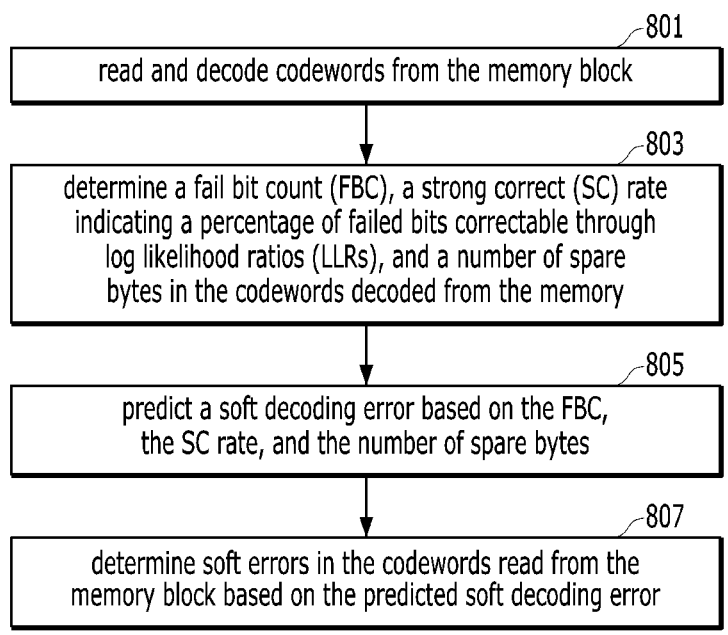
FIG. 8 is a flowchart depicting an exemplary method of the present invention for identifying soft errors in a memory block, in accordance with another embodiment of the present invention.

FIG. 8 illustrates a flowchart for an exemplary method for identifying soft errors in a memory block. The method illustrated in FIG. 8 begins at 801 by reading and decoding codewords from the memory block. At 803, the method continues by determining a fail bit count (FBC), a strong correct (SC) rate indicating a percentage of failed bits correctable through log likelihood ratios (LLRs), and a number of spare bytes in the codewords decoded from the memory. At 805, the method continues by predicting a soft decoding error based on the FBC, the Sc rate, and the number of spare bytes. At 807 the method continues by determining the soft errors in the codewords based on the predicted soft decoding error.

In this method, data from the memory having the soft errors determined based on the predicted soft decoding error may be relocated. In this method, the predicting a soft decoding error may prepare, based on the FBC, the Sc rate, and the number of spare bytes, a two-dimensional soft decoding error prediction table representing a failure probability for the codewords read from the memory block.

In this method, the soft decoding failure may be determined based on entries in the table. The entries in the two-dimensional soft decoding error prediction table may comprise ranges, for the number of spare bytes, the Sc rates, and the FBC, which are indicative of the soft decoding failure. In this method, the ranges may be determined based on a correlation between a codeword failure rate and the FBC at different raw bit error rates. The different raw bit error rates may comprise different sets of the LLRs for correction of the codewords read from the memory block.

In this method, a memory component may be stress tested to determine the FBC and the Sc rate at different operating conditions, and (based on the stress testing at the different operating conditions) a maximum FBC for the memory component may be determined. The memory component may be declared qualified provided the maximum FBC is below a threshold, or the memory component may be declared not-qualified provided the maximum FBC is at or above the threshold.

In this method, the memory may comprise a NAND memory device, and a NAND reliability specification may be provided comprising at different spare byte percentages a) a max raw bit error rate RBER, b) the FBC for the NAND memory, and c) the SC rates.

In another embodiment of the present invention, there is provided a memory having a memory block and a memory controller in communication with the memory block. The memory controller is configured to: a) read and decode codewords from the memory block, b) determine a fail bit count (FBC), a strong correct (SC) rate indicating a percentage of failed bits correctable through log likelihood ratios (LLRs), and a number of spare bytes in the codewords decoded from the memory, c) predict a soft decoding error based on the FBC, the SC rate, and the number of spare bytes, and d) determine soft errors in the codewords read from the memory block based on the predicted soft decoding error.

In this system, the memory controller may be configured to relocate data from the memory having the soft errors determined based on the predicted soft decoding error. The memory controller may also be configured to prepare (based on the FBC, the SC rate, and the number of spare bytes) a two-dimensional soft decoding error prediction table representing a failure probability for the codewords read from the memory block. The memory controller may be configured to determine the soft decoding failure based on entries in the table. The entries in the two-dimensional soft decoding error prediction table may comprise ranges, for the number of spare bytes, the SC rates, and the FBC, which are indicative of the soft decoding failure.

In this system, the memory controller may be configured to determine the ranges based on a correlation between a codeword failure rate and the FBC at different raw bit error rates. The different raw bit error rates may comprise different sets of the LLRs for correction of the codewords read from the memory block.

In this system, the memory controller may be configured to stress test a memory component (at different operating conditions) to determine the FBC and the SC rate, and may determine, based on the stress testing at the different operating conditions, a maximum FBC for the memory component. The memory controller may be configured to declare the memory component qualified provided the maximum FBC is below a threshold, and declare the memory component not-qualified provided the maximum FBC is at or above the threshold.

In this system, the memory may be NAND memory device, and the memory controller may be configured to provide a NAND reliability specification comprising at different spare byte percentages a) a max raw bit error rate RBER, b) the FBC for the NAND memory, and c) the SC rates.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "system" or "processor" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

What is claimed is:

1. A memory system comprising:
a memory block; and
a memory controller in communication with the memory block,
wherein the memory controller is configured to:
read and decode codewords from the memory block,
determine a fail bit count (FBC), a strong correct (SC) rate indicating a percentage of failed bits correctable through log likelihood ratios (LLRs), and a number of spare bytes in the codewords decoded from the memory block,
predict a soft decoding error based on a fixed FBC, a fixed SC rate, and the number of spare bytes, and
determine soft errors in the codewords read from the memory block based on the predicted soft decoding error.

2. The memory system of claim 1, wherein the memory controller is configured to relocate data in the codewords from the memory block having the soft errors determined based on the predicted soft decoding error.

3. The memory system of claim 1, wherein the memory controller is configured to prepare, based on the FBC, the SC rate, and the number of spare bytes, a two-dimensional soft decoding error prediction look-up table representing a failure probability for the codewords read from the memory block.

4. The memory system of claim 3, wherein the memory controller is configured to determine soft decoding failure based on entries in the look-up table.

5. The memory system of claim 3, wherein the entries in the two-dimensional soft decoding error prediction table comprise:
ranges, for the number of spare bytes, the SC rate, and the FBC, which are indicative of the soft decoding failure.

6. The memory system of claim 5, wherein the memory controller is configured to determine the ranges based on a correlation between a codeword failure rate and the FBC at different raw bit error rates.

7. The memory system of claim 6, wherein the different raw bit error rates comprise different sets of the LLRs for correction of the codewords read from the memory block.

8. The memory system of claim 1, wherein the memory controller is configured to:
stress test a memory component at different operating conditions to determine the FBC and the SC rate; and
determine, based on the stress testing at the different operating conditions, a maximum FBC for the memory component.

9. The memory system of claim 8, wherein the memory controller is configured to:
declare the memory component qualified when the maximum FBC is below a threshold; and
declare the memory component not-qualified when the maximum FBC is at or above the threshold.

10. The memory system of claim 1, wherein the memory block comprises a NAND memory, and the wherein the memory controller is configured to:
provide a NAND reliability specification comprising at different spare byte percentages a) a max raw bit error rate RBER, b) the FBC for the NAND memory, and c) the SC rate.

11. A method for identifying soft errors in a memory block, comprising:
reading and decoding codewords from the memory block;
determining a fail bit count (FBC), a strong correct (SC) rate indicating a percentage of failed bits correctable through log likelihood ratios (LLRs), and a number of spare bytes in the codewords decoded from the memory block;
predicting a soft decoding error in the codewords read from the memory block based on a fixed FBC, a fixed SC rate, and the number of spare bytes; and
determining the soft errors based on the predicted soft decoding error.

12. The method of claim 11, further comprising:
only relocating data in the codewords from the memory block having the soft errors determined based on the predicted soft decoding error.

13. The method of claim 11, wherein the predicting a soft decoding error comprises:
preparing, based on the FBC, the SC rate, and the number of spare bytes, a two-dimensional soft decoding error prediction look-up table representing a failure probability for the codewords read from the memory block.

14. The method of claim 13, further comprising:
determining soft decoding failure based on entries in the look-up table.

15. The method of claim 13, wherein the entries in the two-dimensional soft decoding error prediction table comprise:
ranges, for the number of spare bytes, the SC rate, and the FBC, which are indicative of the soft decoding failure.

16. The method of claim 15, further comprising determining the ranges based on a correlation between a codeword failure rate and the FBC at different raw bit error rates.

17. The method of claim 16, wherein the different raw bit error rates comprise different sets of the LLRs for correction of the codewords read from the memory block.

18. The method of claim 11, further comprising:
stress testing a memory component at different operating conditions to determine the FBC and the SC rate; and determining, based on the stress testing at the different operating conditions, a maximum FBC for the memory component.

19. The method of claim 18, further comprising:
declaring the memory component qualified when the maximum FBC is below a threshold; and
declaring the memory component not-qualified when the maximum FBC is at or above the threshold.

20. The method of claim 11, wherein the memory block comprises a NAND memory, and the method further comprises:
providing a NAND reliability specification comprising at different spare byte percentages a) a max raw bit error rate RBER, b) the FBC for the NAND memory, and c) the SC rate.

* * * * *